J. B. McCLELLAND, Jr.
MIRROR SUPPORTING DEVICE.
APPLICATION FILED SEPT. 29, 1909.
968,068.
Patented Aug. 23, 1910.
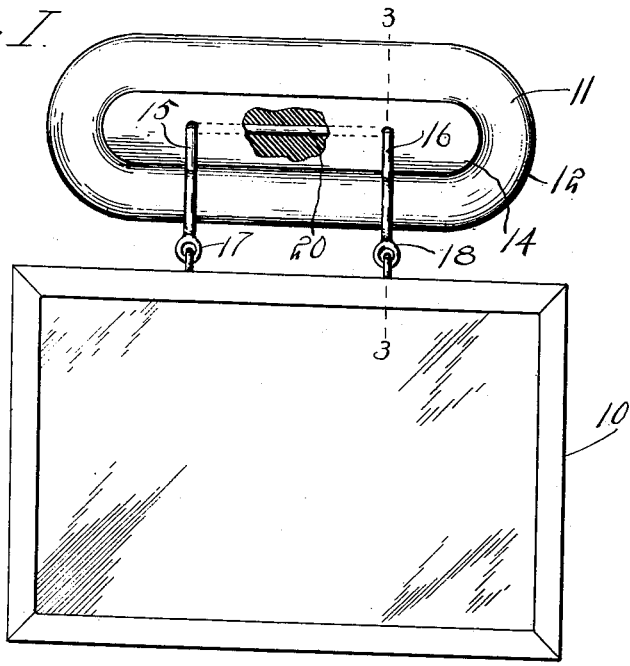
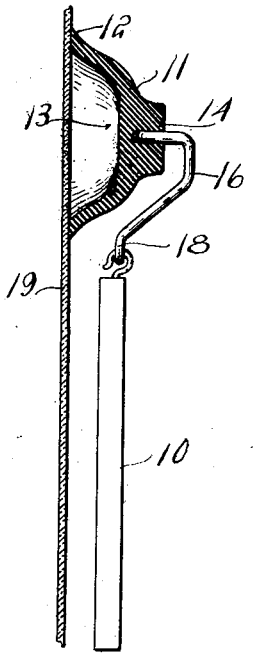
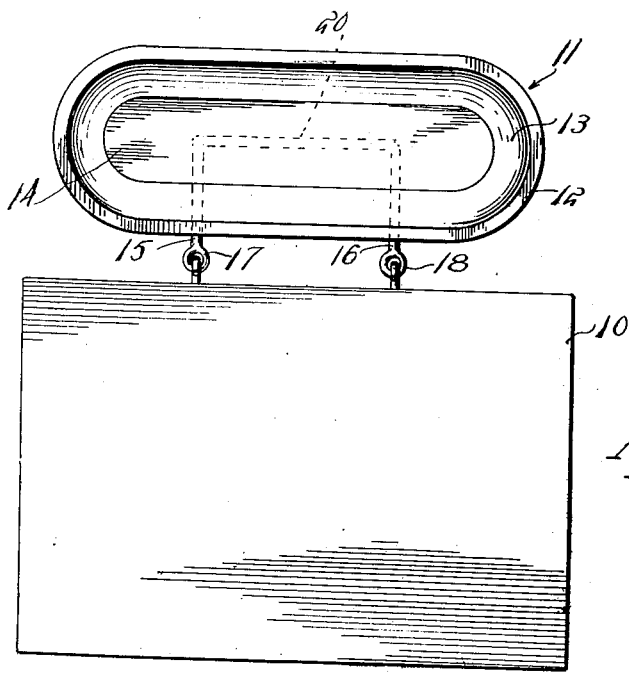
Witnesses
J. C. Simpson
C. N. Woodward
Inventor
James B. McClelland Jr.
By
Attorneys

UNITED STATES PATENT OFFICE.

JAMES B. McCLELLAND, JR., OF CLARENDON, TEXAS.

MIRROR-SUPPORTING DEVICE.

968,068.  Specification of Letters Patent.  Patented Aug. 23, 1910.

Application filed September 29, 1909. Serial No. 520,199.

*To all whom it may concern:*

Be it known that I, JAMES B. MCCLELLAND, Jr., a citizen of the United States, residing at Clarendon, in the county of Donley, State of Texas, have invented certain new and useful Improvements in Mirror-Supporting Devices; and I do hereby declare the following to be a full, clear, and exact description of the invention, such as will enable others skilled in the art to which it appertains to make and use the same.

This invention relates to devices for supporting objects from a smooth surface such as glass, and is designed more particularly for supporting mirrors in convenient position from a window pane or like smooth surface, and has for its object to improve the construction and increase the efficiency and utility of devices of this character.

With this and other objects in view, the invention consists in certain novel features of construction as hereafter shown and described and then specifically pointed out in the claims, and in the drawings illustrative of the preferred embodiment of the invention, Figure 1 is a front elevation of the improved device. Fig. 2 is a rear elevation of the same. Fig. 3 is a side elevation with a portion of the device in section on the line 3—3 of Fig. 1.

The improved device is designed more particularly for supporting a mirror in position, as above noted, but may be employed for supporting other objects or articles, and it is not desired therefore to limit the device for use in connection with any specific article or object with which it may be employed, but for the purpose of illustration the improved device is shown arranged to support a mirror, the mirror being illustrated conventionally at 10.

The improved device comprises an oblong yieldable member 11, concaved on one side and preferably formed from resilient rubber or like material and in elongated cup-shape, as shown, and preferably with rounded ends. The suction cup or member 11 is provided with relatively thin edges 12, and embraces in its construction a concave portion 13. At its outer face the member 11 is provided with a relatively heavy longitudinal portion 14, and fitting in this heavier portion are two suspension devices 15—16. The suspension devices first extend outwardly and are thence directed downwardly and inwardly toward the thinner portion 12 of the member 11 and are coupled at 17—18 to the mirror member 10. By this means the mirror member is swingingly coupled to the member 11 at two points, the coupling points being spaced apart as shown. By this means it will be obvious that when the member 11 is pressed against a glass surface, for instance, a window pane, as indicated at 19, and then permitted to hang downwardly, the partial vacuum produced in the cavity 13 will cause the member 11 to adhere tenaciously to the surface 19 and thus support the mirror in position. The relatively heavy portion 14 of the member 11 insures the necessary rigidity between the members 11 and 10, and prevents displacement after the member 11 has once been applied to the surface 19.

The member 11 will be molded from rubber or like material, and the members 15—16 will be molded into the member 11 when the latter is constructed. The inner terminals of the members 15—16 are preferably connected by a longitudinal bar 20, the three members 15—16—20 being preferably formed from one piece of wire, as shown. By this means the rigidity of the members 15—16 is insured, while at the same time the rigidity of the member 11 is also increased, and its efficiency thereby correspondingly increased.

By constructing the member 11 in oblong shape and employing two of the suspension devices at spaced intervals therein, the mirror is prevented from swinging sidewise, or in a line parallel to the face of the mirror or other supporting structure, which movement would have a tendency to loosen the member 11 and destroy the "suction."

The improved device is simple in construction, can be inexpensively manufactured and of any required size, and adapted for suspending various articles, but, as before stated, is designed more particularly for suspending mirrors, in convenient position for use.

What is claimed is:—

1. A supporting device comprising a suction cup, a rod embedded in said cup and extending longitudinally thereof and outturned at the ends, said outturned ends being directed downwardly and providing means for suspending an object from two points spaced apart and preventing the object from swinging sidewise.

2. A supporting device comprising an oblong suction cup, and a rod embedded in said cup and extending longitudinally thereof, said rod having outturned ends directed downwardly and providing means for suspending an object from two points spaced apart and preventing the object from swinging sidewise.

In testimony whereof, I affix my signature, in presence of two witnesses.

JAMES B. McCLELLAND, Jr.

Witnesses:
 FLORENCE A. GUDE,
 IRVING K. FREY.